United States Patent
Wilson (10) Patent No.: US 10,952,423 B2
(45) Date of Patent: Mar. 23, 2021

(54) SYSTEMS AND METHODS FOR A FISHHOOK REMOVER

(71) Applicant: Carl Wilson, Williamson, TX (US)

(72) Inventor: Carl Wilson, Williamson, TX (US)

(73) Assignee: Hynes Bay Outdoor Products, LLC, Georgetown, TX (US)

( * ) Notice: Subject to any disclaimer, the term of this patent is extended or adjusted under 35 U.S.C. 154(b) by 263 days.

(21) Appl. No.: 15/937,777

(22) Filed: Mar. 27, 2018

(65) Prior Publication Data
US 2018/0288991 A1    Oct. 11, 2018

Related U.S. Application Data

(60) Provisional application No. 62/484,000, filed on Apr. 11, 2017.

(51) Int. Cl.
*A01K 97/18*    (2006.01)

(52) U.S. Cl.
CPC .................................. *A01K 97/18* (2013.01)

(58) Field of Classification Search
CPC ...................................................... A01K 97/18
USPC ........................................................... 43/53.5
See application file for complete search history.

(56) References Cited

U.S. PATENT DOCUMENTS

| | | | |
|---|---|---|---|
| 2,333,695 A * | 11/1943 | Blackstone | A01K 97/18 43/53.5 |
| 2,669,055 A * | 2/1954 | Doerr | A01K 97/18 43/53.5 |
| 2,688,816 A * | 9/1954 | Bondesen | A01K 97/18 43/53.5 |
| 2,861,384 A * | 11/1958 | Kubin | A01K 97/18 43/53.5 |
| 2,947,106 A * | 8/1960 | Lewan | A01K 97/18 43/53.5 |
| 3,680,248 A | 8/1972 | Wilkinson | |
| 3,707,800 A * | 1/1973 | Wolfe | A01K 97/18 43/53.5 |
| 5,490,819 A | 2/1996 | Nicholas et al. | |
| 5,644,865 A * | 7/1997 | Harrison | A01K 97/18 43/53.5 |
| 5,797,536 A | 8/1998 | Smith et al. | |
| 6,240,673 B1 * | 6/2001 | Shelton | A01K 97/18 43/53.5 |
| 6,688,034 B1 * | 2/2004 | Mantel | A01K 97/18 43/53.5 |
| 7,083,630 B2 | 8/2006 | Devries et al. | |
| 7,124,918 B2 * | 10/2006 | Rascoe | A45D 2/00 223/48 |
| 7,699,835 B2 * | 4/2010 | Lee | A61B 17/062 606/1 |
| 8,667,730 B1 * | 3/2014 | Hughes | A01K 97/18 294/103.1 |
| 8,795,166 B2 | 8/2014 | Roth et al. | |

(Continued)

*Primary Examiner* — Darren W Ark
*Assistant Examiner* — Kevin M Dennis
(74) *Attorney, Agent, or Firm* — Pierson Intellectual Property LLC (57) ABSTRACT

Embodiments disclosed herein describe systems and methods for a device configured to reverse the direction of a fish hook up to two hundred degrees deep within a fish's gullet. This may allow the hook to be extracted without a barb of the hook re-engaging itself into the fish's tissue, as well as without the fisherman inserting their hand into the fish's mouth.

20 Claims, 5 Drawing Sheets

(56) References Cited

U.S. PATENT DOCUMENTS

| | | | |
|---|---|---|---|
| 2003/0112622 A1* | 6/2003 | Chu | A01K 97/18 362/109 |
| 2007/0287993 A1 | 12/2007 | Hinman et al. | |
| 2008/0005955 A1* | 1/2008 | Larcher | A01K 97/18 43/53.5 |
| 2008/0313950 A1* | 12/2008 | Larcher | A01K 97/18 43/53.5 |
| 2011/0132960 A1 | 6/2011 | Whitmen et al. | |
| 2012/0083826 A1 | 5/2012 | Chao et al. | |
| 2019/0387731 A1* | 12/2019 | Simos | A01K 97/18 |

* cited by examiner

SYSTEMS AND METHODS FOR A FISHHOOK REMOVER

CROSS-REFERENCE TO RELATED APPLICATIONS

This application claims a benefit of priority under 35 U.S.C. § 119 to Provisional Application No. 62/484,000 filed on 11 Apr. 2017, which is fully incorporated herein by reference in their entirety.

BACKGROUND INFORMATION

Field of the Disclosure

Examples of the present disclosure are related to systems and methods for a fishhook remover. More specifically, embodiments are directed towards a fishhook extraction device with a hook holder that is configured to rotate in a plane in parallel to a shaft of the device.

Background

Catch and release is a practice within recreational fishing intended as a technique of conversion. After fish are caught, the fish are unhooked and returned to the water. However, when fishing, a fish hook can become lodged within organs of the fish or the fish may swallow the fish hook. This creates situations where fishermen are unable to safely remove the hook from the fish's organs through the gullet lining without injuring or killing the fish. Specifically, removing a hook from the fish's organ can be a difficult task due to the confined space within the stomach, gullet, and/or other organs.

Conventional devices to remove hooks from fish utilize forceps, pliers, and tongs with clamping jaws that grip the hook. This allows the fisherman to manipulate the hook. However, conventional devices and tools to remove hooks do not allow the fish hook to be rotated to reverse the direction of the barb within the confined space.

Accordingly, needs exist for more effective and efficient systems and methods for removing a fish hook from within a fish that includes a hook holder that is configured to rotate in a plane in parallel to a shaft of the device.

SUMMARY

Embodiments disclosed herein describe systems and methods for a device configured to reverse the direction a fish hook, artificial fly, or any other article up to two hundred degrees deep within a fish's or other animals gullet. This may allow the hook to be extracted without a barb of the hook re-engaging itself into the fish's tissue, as well as without the fisherman inserting their hand into the fish's mouth.

Embodiments may include a tubular housing, an extending bar, a removal tool, and trigger.

The tubular housing may extend from a proximal end of the device towards the distal end of the device, and be configured to house the extending bar and provide a coupling point for the removal tool.

The extending bar may be mounted inside the tubular housing, and extend from the trigger to the removal tool. A distal end of the extending bar may include a rack that is configured to interface with a pinion within the removal tool. The rack may be configured to move in a first direction responsive to the trigger being pressed, and move in a second direction responsive to releasing the trigger.

A removal tool may be mounted on a distal end of the tubular housing. The removal tool may include a pinion, shaft, and hook holder. The hook holder may be configured to rotate in a direction perpendicular to the movement of the rack and in a plane parallel to a longitudinal axis of the elongated tubular housing.

In embodiments, the pinion may be configured to interface with the rack, and convert linear force received by the rack into rotational force. Responsive to the pinion rotating, the hook holder may simultaneously rotate.

The shaft may be configured to couple the pinion with the hook holder, and transfer the rotational force of the pinion to the hook holder. Responsive to the pinion rotating, the shaft and hook holder may correspondingly rotate, wherein the hook holder may rotate up to two hundred degrees. Embodiments may allow for up to two hundred degrees rotation to allow the removal of both "J" hooks and "Circle" hooks. Because circle hooks are sharply curved back in a circular shape, they require more than 180 degrees rotation to reverse the barb.

In use, a distal end of the device may be first inserted into the stomach of a fish, wherein a fish hook shank may be inserted into the hook holder via an insertion slot within the hook holder. Responsive to pressing the trigger, the extending bar may move rearward. As the extending bar moves rearward, a rack engages with the teeth of the pinion. The linear motion applied to the rack causes the pinion to rotationally move relative to the linear motion rack. This linear movement rotates the pinion and the hook holder by one hundred eighty degrees, and up to two hundred degrees. Due to the fish hook being inserted into the hook holder, the fish hook is reversed and dislodged from the stomach lining of the fish. The device can then be pulled outward so the hook can be removed from the stomach of the fish without the barb re-engaging the fish's tissue.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Figure 1:
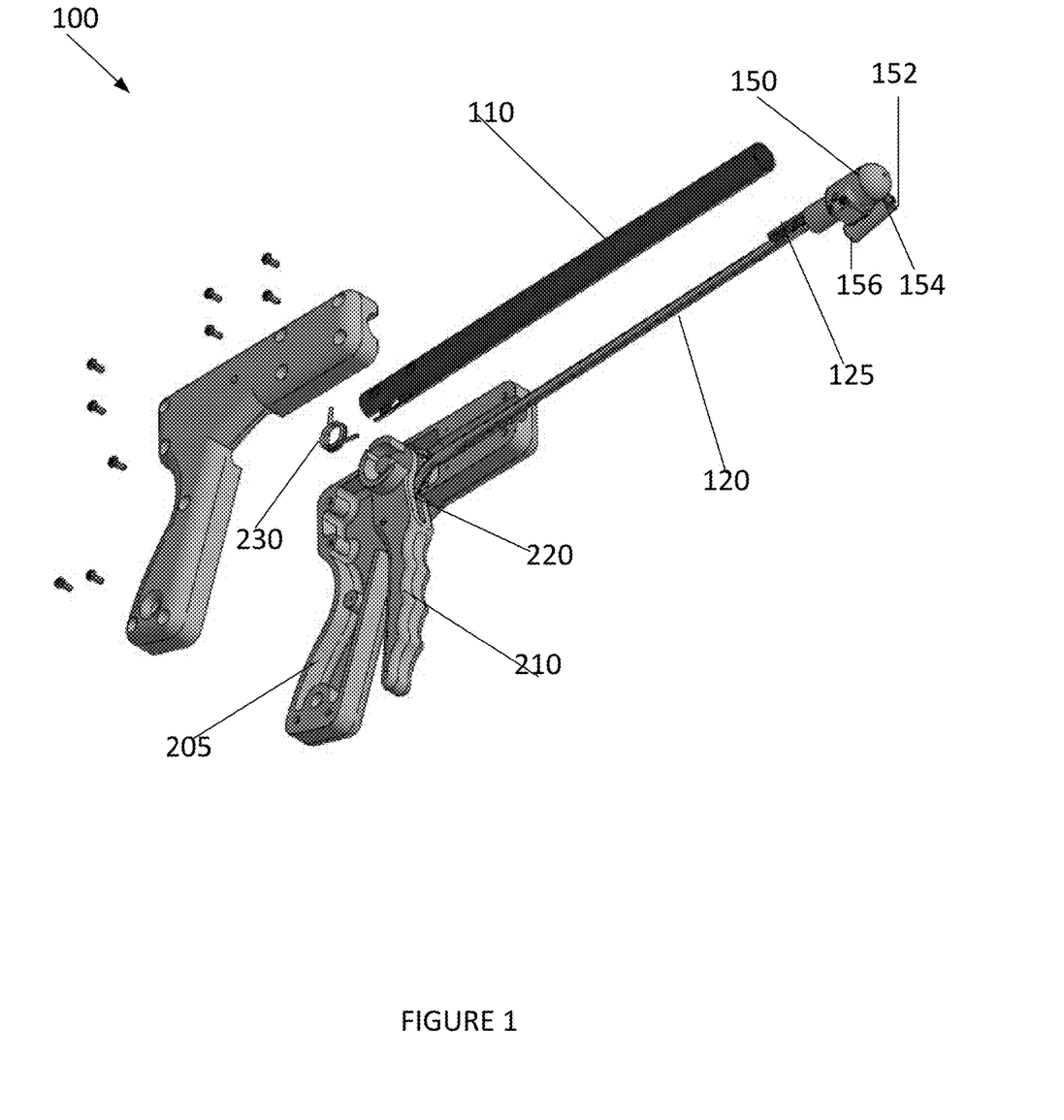
FIG. 1 depicts a cross sectional view of an extraction device, according to an embodiment.

FIG. 1 depicts a cross sectional view of an extraction device 100, according to an embodiment. Extraction device 100 may be utilized to remove an article, such as a fish hook, that is internally and/or externally positioned within an animal, such as a fish. Extraction device 100 may include housing 110, extending bar 120, rack 125, pinion 130, shaft 140, removal tool 150, handle 205, trigger 210, pivot pin 220, and torsion springs 230.

Housing 110 may be a hollow tubular device that extends from a proximal end or handle of extraction device 100 to a distal end of extraction device 100. The inner diameter across the hollow tubular interior of housing 110 may be a first length. Housing 110 may be configured to extend along a linear axis in a first plane. Housing 110 may be comprised of a rigid material, such as stainless steel.

Extending bar 120 may be a conduit, tube, cylinder, etc. that is configured to extend through housing 110. Extending bar 120 may be configured to move along a linear axis defined by a longitudinal axis of housing 110. In embodiments, extending bar 120 may move towards a distal end of housing 110 responsive to a trigger being pressed, and extending bar 120 may move towards a proximal end of housing 110 responsive to the trigger being pressed. A first part of extending bar 120 may be linear bar with a first end being coupled with the trigger of extraction device 100. A second part of extending bar 120 may form rack 125.

Rack 125 may be a linear bar that is offset from the longitudinal axis of the first part of extending bar 120. Rack 125 may include a first set of teeth, projections, grooves, indentions, etc. that are configured to interface with pinion 130. Responsive to the first part of extending bar 120 moving along a first linear axis, rack 125 may move along a second linear axis, wherein the second linear axis may be offset from the first linear axis.

Removal tool 150 may be a device configured to be coupled with a second end of tubular housing 110. Removal tool 150 may have an end with a smaller diameter than that of housing 110, such that the end may be inserted into housing 110. Removal tool 150 may include a pinion and shaft (as discussed in FIG. 2), wherein responsive to extending bar 120 moving in the linear axis the pinion may correspondingly rotate. This may cause the shaft and hook holder 152 to rotate.

Hook holder 152 may be a substantially cylindrical body that is configured to receive a shank or part of a fish hook or artificial fly. When hook holder 152 receives a fish hook or an artificial fly, a body of hook holder 152 may protect fish hook, the artificial fly, and/or the fish during removal. Hook holder 152 may have a slit, channel, etc. that extends from a first end 154 of hook holder 152 to a second end 156 of hook holder 152, wherein part of the fish hook may be inserted into a body of hook holder 152 through the slit. In embodiments, hook holder 152 may be configured to be positioned in a plane that is offset from the longitudinal axis of housing 110. Responsive to the shaft being rotated, hook holder 152 may rotate in a direction that is perpendicular to a longitudinal axis of shaft 140 and in a plane that is parallel to a longitudinal axis of housing 110. Responsive to hook holder 152 receiving a fish hook, a trigger on extraction device 100 may be pressed, which may rotate hook holder 152 one hundred eighty degrees, and up to two hundred degrees. This may correspondingly rotate the fish hook, such that the fish hook does not reengage with the fish. In implementations, hook holder 152 may be configured to rotate up to two hundred degrees, such that in a first mode first end 154 may face away from a user and second end 156 may face towards the user. When hook holder 152 is rotated, hook holder 152 may rotate in a direction perpendicular to the shaft and in a plane parallel and offset from that of the longitudinal axis of extending bar, such that first end 154 faces towards the user and second end 156 faces away from the user.

Handle 205 may be positioned on a proximal end of extraction device 100, and may be configured to be secured in the palm of a user.

Trigger 210 may be a device that initiates rotating sequences associated with extraction device 100 responsive to trigger 210 being pulled or release. Responsive to depressing trigger 210, extending bar 120 may move in a first direction. Responsive to releasing trigger 210, extending bar 120 may move in a second direction.

Torsion springs 230 may apply force to trigger 210 in a cocked or engaged position. A first torsion spring 230 may be configured to apply force in a first direction, and a second torsion spring 230 may be configured to apply force in a second direction, wherein the first direction is associated with the cocked position and the second direction is associated with the engaged position. When the trigger 210 is in the engaged position, the second torsion spring may apply force against trigger 210 to return trigger 210 to the cocked position. This may automatically reset hook holder 152 when pressure is not being applied to trigger 210. In embodiments, responsive to fully pressing trigger 210, rack 125 may be configured to linearly move a distance that corresponds with a two hundred degree rotation in a first direction. Responsive to no longer pressing trigger 210, rack 125 may be configured to automatically linearly move in a second direction a distance that corresponds with an up to two hundred degrees rotation in a second direction. This may be utilized to automatically reset extraction device 100.

Pivot pin 220 may be configured to mechanically couple extending bar 120 with trigger 210. Responsive to trigger 210 being depressed, pivot pin 220 may move extending bar 120 in a first linear direction, which may be towards a proximal end of extraction device 100. Responsive to trigger 210 no longer being pressed, pivot pin 220 may move extending bar 120 in a second linear direction, which may be towards a distal end of extraction device 100.

Figure 2:
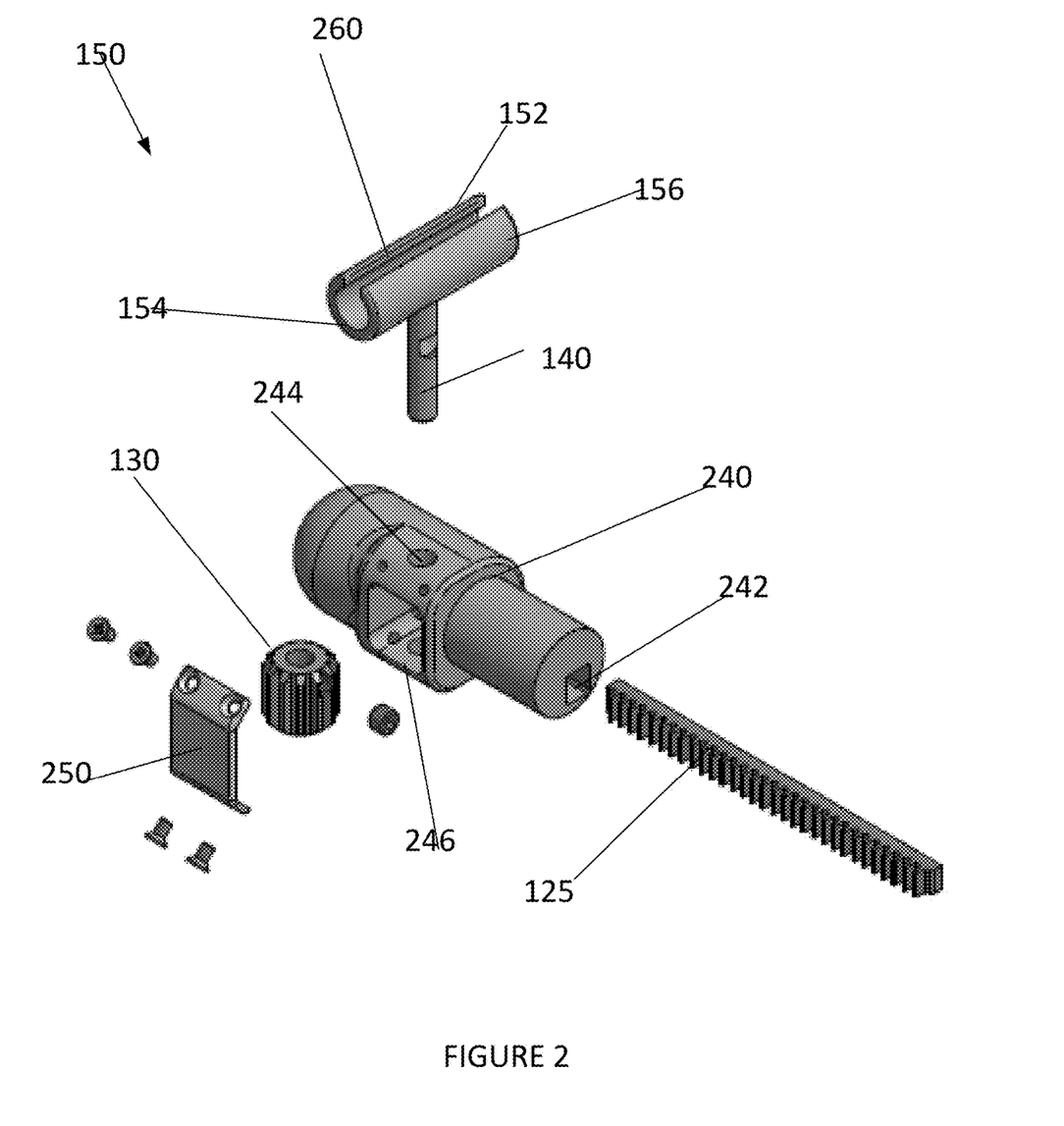
FIG. 2 depicts an exploded view of a removal tool, according to an embodiment.

FIG. 2 depicts an exploded view of removal tool 150, according to an embodiment. Certain elements depicted in FIG. 2 are described above, and for the sake of brevity another description of these elements is omitted.

As depicted in FIG. 2, hook holder 152 may be substantially cylindrical in shape, wherein hook holder 152 includes slot 260. Slot 260 may extend through the curved surface of hook holder 152 from first end 154 to second end 156, which may allow a fisherman to insert a fishing line into a body of hook holder 152. Once the fishing line is encompassed within hook holder 152, hook holder 152 may slide down the fishing line and engage the fly or hook inside of the fish's stomach. Hook holder 152 may then be rotated up to two hundred degrees to be removed.

As further depicted in FIG. 2, shaft 140 may be configured to be inserted into an orifice within pinon 130. This may allow shaft 140 to rotate responsive to pinion 130 rotating.

Removal tool 150 may include a body 240 with a first opening 242, second opening 244, third opening 246, and panel 250.

First opening 242 may be a first geometric shape positioned on a front sidewall of removal tool 150, and be configured to receive rack 125. First opening 242 may allow rack to slide in and out of removal tool 150 in a linear direction.

Second opening 244 may be positioned on a left sidewall of removal tool 150, and third opening 246 may be positioned on a right sidewall of removal tool 150. Second opening 244 and third opening 246 may be configured to allow shaft 140 to extend through removal tool 150 to be temporarily coupled to pinion 130. In implementations, shaft 140 may extend through second opening 244 to position hook holder 152 on a left side of removal tool 150, and extend through third opening to position hook holder 152 on a right side of removal tool 150. Based on the positioning of hook holder 152, right and left handed users may use extraction device 100.

Panel 250 may be removably coupled to a lower sidewall of removal tool 150. Responsive to removing panel 250, shaft 140 may be decoupled from pinion 130. This may allow shaft 140 to be repositioned through second or third opening 244, 246.

Figure 3:
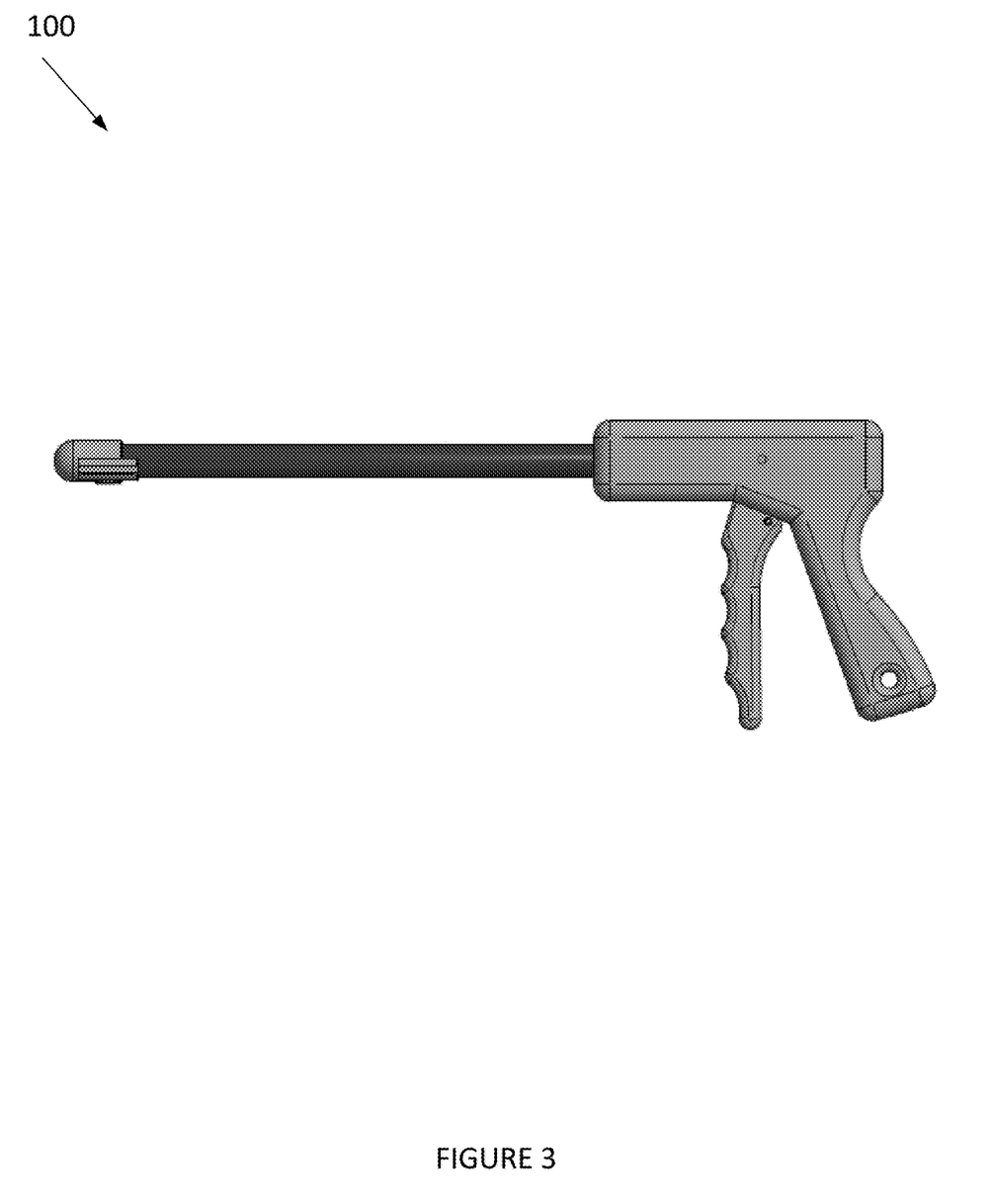
FIG. 3 depicts a side view of an extraction device, according to an embodiment.

FIG. 3 depicts a side view of extraction device 100, according to an embodiment. Certain elements depicted in FIG. 3 are described above, and for the sake of brevity another description of these elements is omitted.

Figure 4:
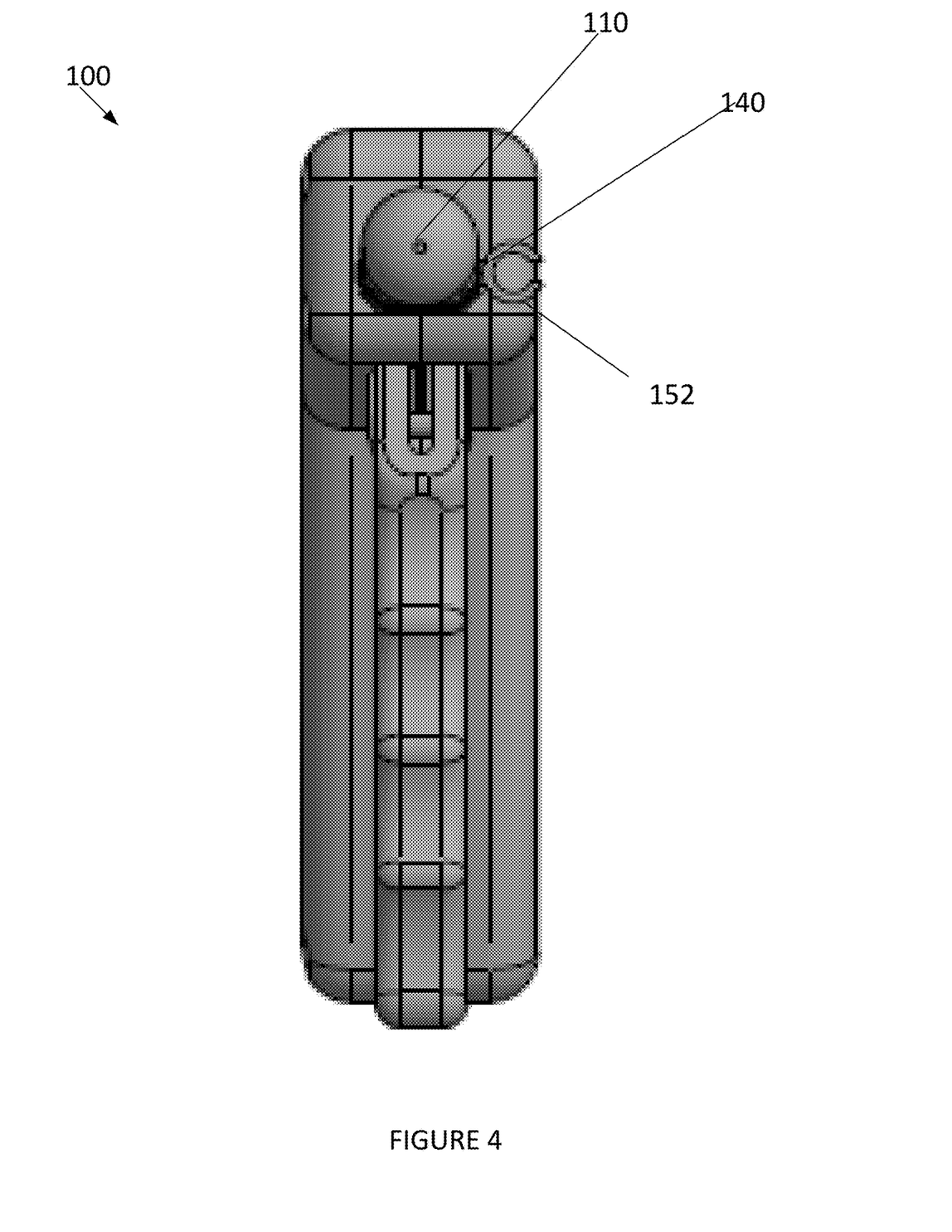
FIG. 4 depicts a front view of an extraction device, according to an embodiment.

FIG. 4 depicts a front view of extraction device 100, according to an embodiment. Certain elements depicted in FIG. 4 are described above, and for the sake of brevity another description of these elements is omitted.

As depicted in FIG. 4, the longitudinal axis of hook holder 152 may be offset from housing 110, such that hook holder 152 may rotate in a plane that is offset from that of housing 110. Hook holder 152 may be offset from housing 110 based on the length of shaft 140. However, it may be desirable to position the rotational axis of hook holder 152 proximate to housing 110. This may limit the surface area of extraction device 100 obstructing organs within a fish.

Figure 5:
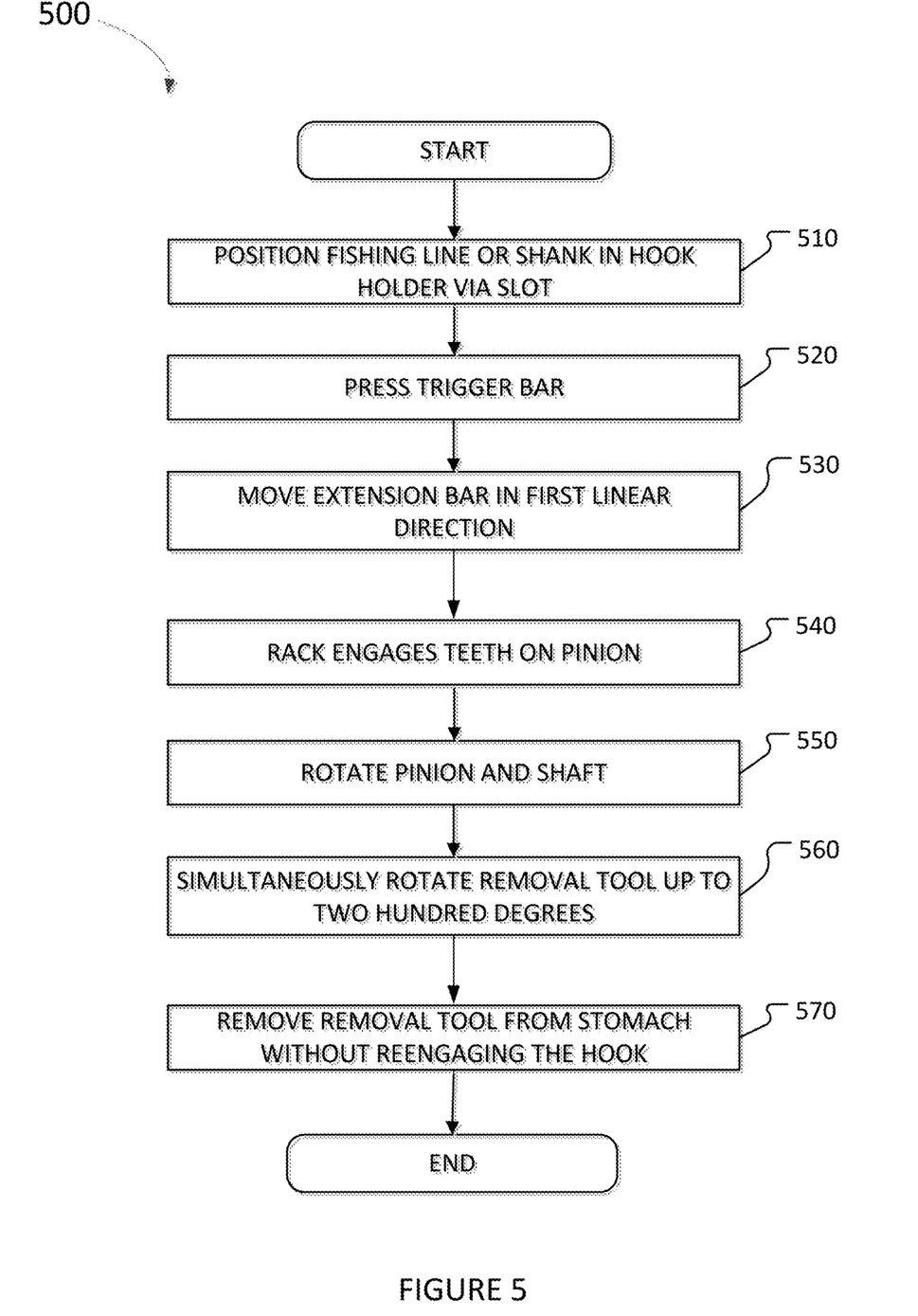
FIG. 5 depicts a method for removing a fish hook without reengaging the barb of the hook, according to an embodiment.

FIG. 5 depicts a method 500 for removing a fish hook without reengaging the barb of the hook, according to an embodiment. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

At operation 510, a fishing line or shank may be inserted into a hook holder via a slot extending through the hook holder. Utilizing the fishing line, the hook holder may be guided to the end of the shank of a hook, which may be positioned within a fish. By positioning the hook holder around the shank, the fish may be protected from the shank.

At operation 520, a trigger on the extraction device may be pressed.

At operation 530, responsive to the trigger being pressed, an extending bar may move in a first linear direction, which may be towards the trigger.

At operation 540, when the extending bar is moving in the first linear direction, a rack with a first set of teeth positioned on an end of the extending bar may engage with a second set of teeth positioned on a pinion.

At operation 550, while the first set of teeth engages with the second set of teeth, the pinion may convert the linear movement of the extending bar into rotational movement. This rotational movement may rotate the pinion and a shaft extending through the pinion.

At operation 560, responsive to the shaft rotating, the hook holder positioned on the end of the shaft may simultaneously rotate. Based on the sizing and length of the rack with respect to the pinion, the shaft may be configured to rotate hook holder up to two hundred degrees.

At operation 570, while the hook holder is rotated, and maintained in the rotated position by holding down the trigger, the removal tool and hook may be safely removed from the interior of the fish. In embodiments, responsive to no longer pressing the trigger, the rack may move in a second linear direction, rotating the hook holder two hundred degrees in an opposite direction to reset the extraction device.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The invention claimed is:

1. An extraction device comprising: an extending bar configured to move in a first linear direction; a rack positioned on a distal end of the extending bar, the rack being configured to move in the first linear direction responsive to the extending bar moving, the rack including a first set of teeth; a pinion configured to rotate responsive to the extending bar moving in the first linear direction, the pinion having a second set of teeth configured to interface with the first set of teeth to rotate the pinion; a hook holder being a cylindrical body with a slot, the hook holder being configured to rotate in a first plane responsive to the pinion rotating to rotate a fish hook, the first plane being in parallel to the first linear direction, the hook holder having an open first end and an open second end, wherein the slot is a continuous linear slot that extends from the first end to the second end and continually faces in a direction away from the extending bar in a second plane that intersects the extending bar, the slot extending from an outer diameter of the cylindrical body to an inner diameter of the cylindrical body; a shaft being configured to couple the pinion and the hook holder, the shaft being positioned at a middle of the hook holder, wherein the shaft has an axis of rotation which extends in the second plane, the second plane extending through the slot.

2. The extraction device of claim 1, wherein the rack is offset from the extending bar.

3. The extraction device of claim 1, wherein the hook holder is configured to rotate the fish hook between one hundred eighty and two hundred degrees to reverse a direction of the fish hook.

4. The extraction device of claim 1, wherein the slot extends from a first end of the hook holder to a second end of the hook holder.

5. The extraction device of claim 1, further comprising:
a tubular housing having a first inner diameter, the tubular housing being configured to house the extending bar.

6. The extraction device of claim 5, further comprising:
a removal tool configured to house the pinion, the removal tool including a round end with a second diameter, the round end of the removal tool being configured to be inserted into the tubular housing.

7. The extraction device of claim 6, wherein the removal tool includes a first orifice configured to receive the rack, the first orifice being positioned through the round end.

8. The extraction device of claim 7, wherein the removal tool includes a second orifice and a third orifice positioned on opposite sides of the removal tool, the second orifice and the third orifice being configured to receive the shaft.

9. The extraction device of claim 1, wherein the pinion is configured to rotate in a first angular direction responsive to the extending bar moving in the first linear direction, and the pinion is configured to rotate in a second angular direction responsive to the extending bar moving in a second linear direction.

10. The extraction device of claim 9, further comprising:
a trigger configured to move the extending bar in the first linear direction and the second linear direction.

11. A method of using an extraction device comprising:
moving a rack positioned on a distal end of an extending bar in a first linear direction, the rack including a first set of teeth; rotating a pinion responsive to the extending bar moving in the first linear direction by interfacing a second set of teeth on the pinon with the first set of teeth; rotating a hook holder with a cylindrical body and a slot in a first plane responsive to the pinion rotating to rotate a fish hook, the first plane being in parallel to the first linear direction, the hook holder being coupled to the pinon via a shaft, the hook holder having an open first end and an open second end, wherein the slot is a continuous linear slot that extends from the first end to the second end and continually faces in a direction away from the extending bar in a second plane that intersects the extending bar, the shaft being positioned at a middle of the hook holder, wherein the shaft has an axis of rotation which extends in the second plane, the second plane extending through the continuous linear slot, the slot extending from an outer diameter of the cylindrical body to an inner diameter of the cylindrical body.

12. The method of claim 11, wherein the rack is offset from the extending bar.

13. The method of claim 11, further comprising:
rotating the fish hook between one hundred eighty and two hundred degrees to reverse a direction of the fish hook.

14. The method of claim 11, wherein the slot extends from a first end of the hook holder to a second end of the hook holder.

15. The method of claim 11, further comprising:
housing the extending bar within a tubular housing having a first inner diameter.

16. The method of claim 15, further comprising:
housing the pinion within a removal tool, the removal tool including a round end with a second diameter;
inserting the round end of the removal tool into the tubular housing.

17. The method of claim 16, further comprising:
positioning the rack into a first orifice in the removal tool, the first orifice being positioned through the round end.

18. The method of claim 17, wherein the removal tool includes a second orifice and a third orifice positioned on opposite sides of the removal tool, the second orifice and the third orifice being configured to receive the shaft.

19. The method of claim 11, further comprising:
rotating the pinion in a first angular direction responsive to the extending bar moving in the first linear direction;
rotating the pinion in a second angular direction responsive to the extending bar moving in a second linear direction.

20. The method of claim 19, further comprising:
pressing and releasing a trigger to move the extending bar in the first linear direction and the second linear direction.

* * * * *